United States Patent

Kondo et al.

[11] Patent Number: 5,982,727
[45] Date of Patent: Nov. 9, 1999

[54] DISC RECORDING/REPRODUCING APPARATUS WITH A SELECTABLE METHOD OF GENERATING A TABLE OF CONTENTS

[75] Inventors: Toshiharu Kondo, Kanagawa; Yukio Shirako, Tokyo; Teruhito Noshiro, Kanagawa, all of Japan

[73] Assignee: Sony Corporation, Tokyo, Japan

[21] Appl. No.: 08/207,801

[22] Filed: Mar. 7, 1994

Related U.S. Application Data

[63] Continuation of application No. 07/965,747, Oct. 23, 1992, abandoned.

[30] Foreign Application Priority Data

Oct. 30, 1991 [JP] Japan .................................. 3-311883

[51] Int. Cl.⁶ .................................................. G11B 7/00
[52] U.S. Cl. ............................................................. 369/54
[58] Field of Search ............................ 369/47, 48, 58, 369/54, 32; 360/48

[56] References Cited

U.S. PATENT DOCUMENTS

| | | | |
|---|---|---|---|
| 4,229,808 | 10/1980 | Hui | 369/48 X |
| 4,862,439 | 8/1989 | Ando et al. | 369/58 X |
| 4,931,927 | 6/1990 | Ishiwata et al. | 369/44.26 X |
| 4,939,598 | 7/1990 | Kulakowski et al. | 360/48 |
| 5,047,867 | 9/1991 | Strubbe et al. | 358/335 |
| 5,111,442 | 5/1992 | Nakajima et al. | 369/54 X |
| 5,177,720 | 1/1993 | Kondo | 369/32 |

*Primary Examiner*—W. R. Young
*Attorney, Agent, or Firm*—Limbach & Limbach L.L.P.

[57] ABSTRACT

In an optical disc recording/reproducing apparatus having a device for seeking a predetermined position on a postscript type optical disc, a device for reading recorded data from the disc, and a device for recording data and a time table on predetermined data area and table area of the disc, respectively, a method of recording the time table comprising the steps of: reading position data corresponding to a position of each recorded data on the disc; detecting remaining data area on which no data is recorded; dividing the remaining data area into a plurality of small areas; and recording the position data of each recorded data and each small area on the time table area.

8 Claims, 12 Drawing Sheets

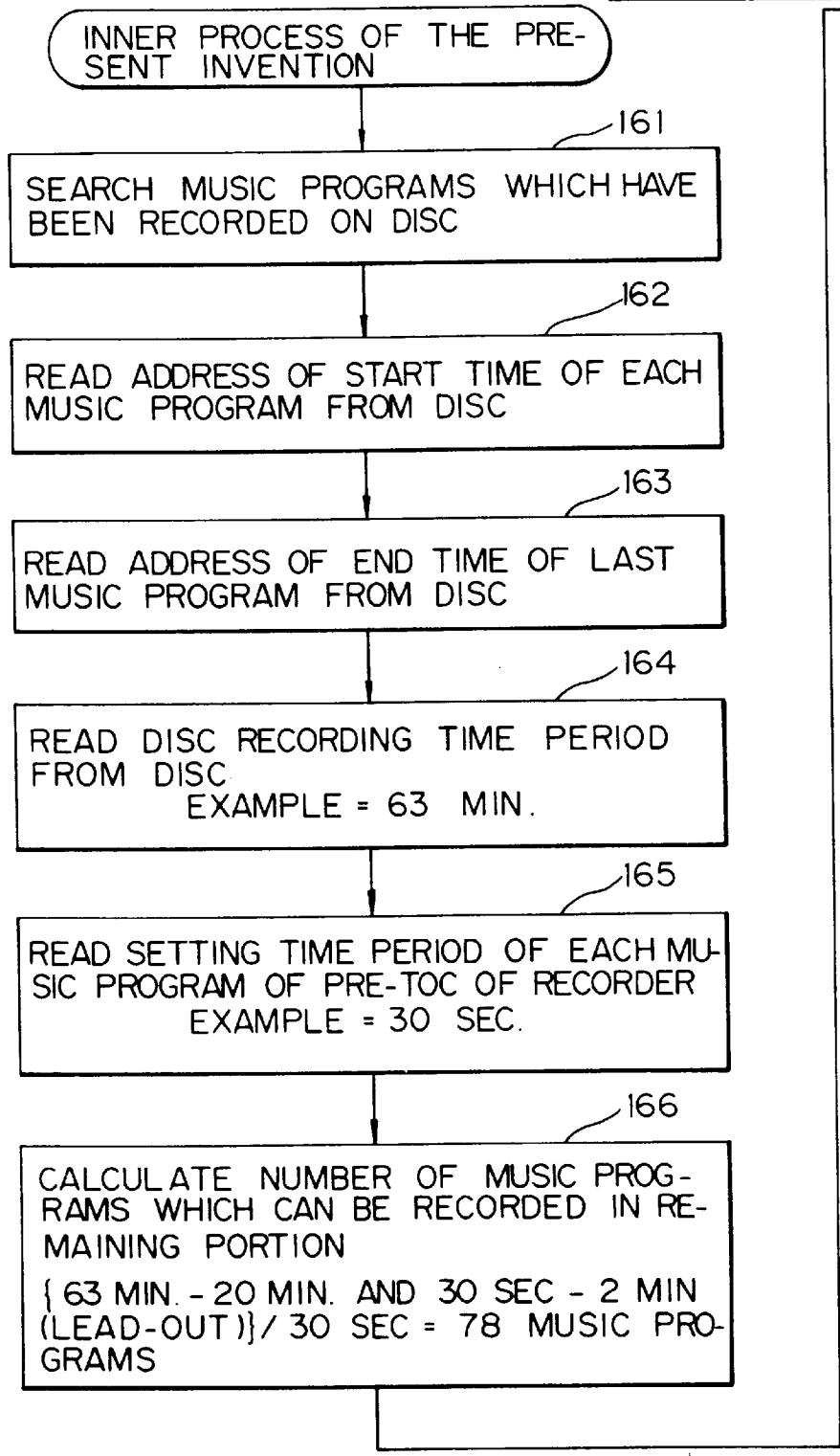

DISC RECORDING/REPRODUCING APPARATUS WITH A SELECTABLE METHOD OF GENERATING A TABLE OF CONTENTS

This is a continuation of application Ser. No. 07/965,747 filed on Oct. 23, 1992, now abandoned.

BACKGROUND OF THE INVENTION

1. Field of the Invention

The present invention relates to an optical disc recording/reproducing apparatus using a postscript type CD-R disc which can record music data and so forth.

2. Description of the Prior Art

Thus far, a postscript type CD which satisfies the optical standard of a CD (Compact Disc) and which can reproduce data which has been recorded thereon with a conventional CD player is becoming known. This type CD is hereinafter referred to as the CD-R. With this postscript type CD-R, a small number of CDs can be easily produced for specific purposes and personal use.

A CD is provided with a TOC (Table of Contents) at a lead-in area located on the outermost periphery thereof. In the TOC, data position information such as an absolute time at which each music program recorded on the disc starts, a first music program number, a last music program number, and an end time at which the last music program ends is recorded. In a conventional CD player, usually, this lead-in TOC is first accessed. Thus, the data position information is obtained. With this data position information, a pick-up is accessed to a desired music program position and a random access operation is performed.

With respect to the postscript type CD-R, so far the following techniques for recording TOC data have been proposed.

One of these techniques is referred to as the after-TOC technique. In this technique, all music programs to be recorded are recorded on a disc. After TOC data according to the recorded music programs has been designated, TOC data is recorded at the lead-in area. This after-TOC technique is disclosed in, for example, U.S. Pat. No. 4,931,927.

The other technique is referred to as the pre-TOC technique. In this technique, a TOC area has been recorded in advance so that music program areas are divided into segments of a predetermined time period. After the TOC data has been recorded, music data is recorded in accordance with the music program areas divided by the TOC data.

In the after-TOC technique, since the TOC data is recorded after the music data has been recorded and then the TOC data has been designated, the start time and end time of each music program which has been recorded accord with those designated with the TOC data. Thus, when a music program is reproduced, its start and end position can be easily accessed.

However, in the postscript type CD, the TOC data cannot be changed. Thus, in the after-TOC technique, even if a blank area is present in a record area where music data has been initially recorded, another music data cannot be recorded on a postscript basis. This is because the postscript music data causes the TOC to be changed. Thus, in the after-TOC technique, the record area is sometimes wastefully used.

On the other hand, in the pre-TOC technique, since a TOC which divides music data into segments of a predetermined time period has been recorded, a music data area for each music program has been provided in advance. Thus, on a disc where several music programs have been recorded, music data can be recorded on the postscript basis. However, in the pre-TOC technique, since the music data area is divided into segments of a predetermined time period, the time period of a music program which has been recorded does not sometimes match that designated with the TOC data. Thus, it becomes difficult to access the start and positions of each music program by using the TOC data.

OBJECTS AND SUMMARY OF THE INVENTION

Therefore, an object of the present invention is to provide an optical disc recording/reproducing apparatus which can be easily accessed without a loss of a record area.

According to an aspect of the present invention, there is provided an optical disc recording/reproducing apparatus having means for seeking a predetermined position on a postscript type optical disc, means for reading recorded data from the disc, and means for recording data and a time table on predetermined data area and table area of the disc, respectively, a method of recording the time table comprising the steps of: reading position data corresponding to a position of each recorded data on the disc; detecting remaining data area on which no data is recorded; dividing the remaining data area into a plurality of small areas; and recording the position data of each recorded data and each small area on the time table area.

According to another aspect of the present invention, there is provided an optical disc recording/reproducing apparatus having means for seeking a predetermined position on a postscript type optical disc, means for reading recorded data from the disc, and means for recording data and a timetable on predetermined data area and time table area of the disc, respectively, a method of recording the time table comprising the steps of; reading time code data corresponding to a starting position of each recorded data; reading time code data corresponding to the ending position of the last recorded data; reading time length corresponding to the data area; calculating remaining time length corresponding to a remaining data area on which no data is recorded by subtracting the time code data corresponding to the ending position from the time length corresponding to the data area; dividing the calculated remaining time length to construct a plurality of small data areas; and recording time code data corresponding to the starting position of each recorded data and each the small data area on the time table area.

According to still another aspect of the present invention, there is provided an optical disc recording/reproducing apparatus having means for seeking a predetermined position on a postscript type optical disc, means for reading recorded data from the disc, means for recording data and a time table on predetermined data area and table area of the disc, respectively, and means for selecting one from a plurality of modes of recording the time table, one of the plurality of modes comprising the steps of; reading position data corresponding to a position of each recorded data on the disc; detecting remaining data area on which no data is recorded; dividing the remaining data area into a plurality of small areas; and recording the position data of each recorded data and each small data on the time table area.

A postscript basis pre-TOC mode can be set. In this mode, after music data of several music programs has been recorded, the record time period of the remaining area is divided into segments of a predetermined time period for each music program. The TOC data which is obtained by dividing the remaining area into segments of a predetermined time period is recorded along with the TOC data of the music programs which have been recorded. In this case, the time period of music data which has been recorded before the TOC is recorded accords with the data of the TOC. Thus, the music programs can be easily accessed. In the postscript basis pre-TOC mode, even after the TOC has been recorded, music data can be recorded on the postscript basis without a loss of the record storage capacity.

The above, and other, objects, features and advantage of the present invention will become readily apparent from the following detailed description thereof which is to be read in connection with the accompanying drawings.

BRIEF DESCRIPTION OF THE DRAWINGS

FIGS. 4, 5, 6, 6A, and 6B are flow charts describing an embodiment of the present invention;

FIGS. 14, 15, 15A, and 15B are flow charts describing the embodiment of the present invention.

DETAILED DESCRIPTION OF THE PREFERRED EMBODIMENT

Figure 1:
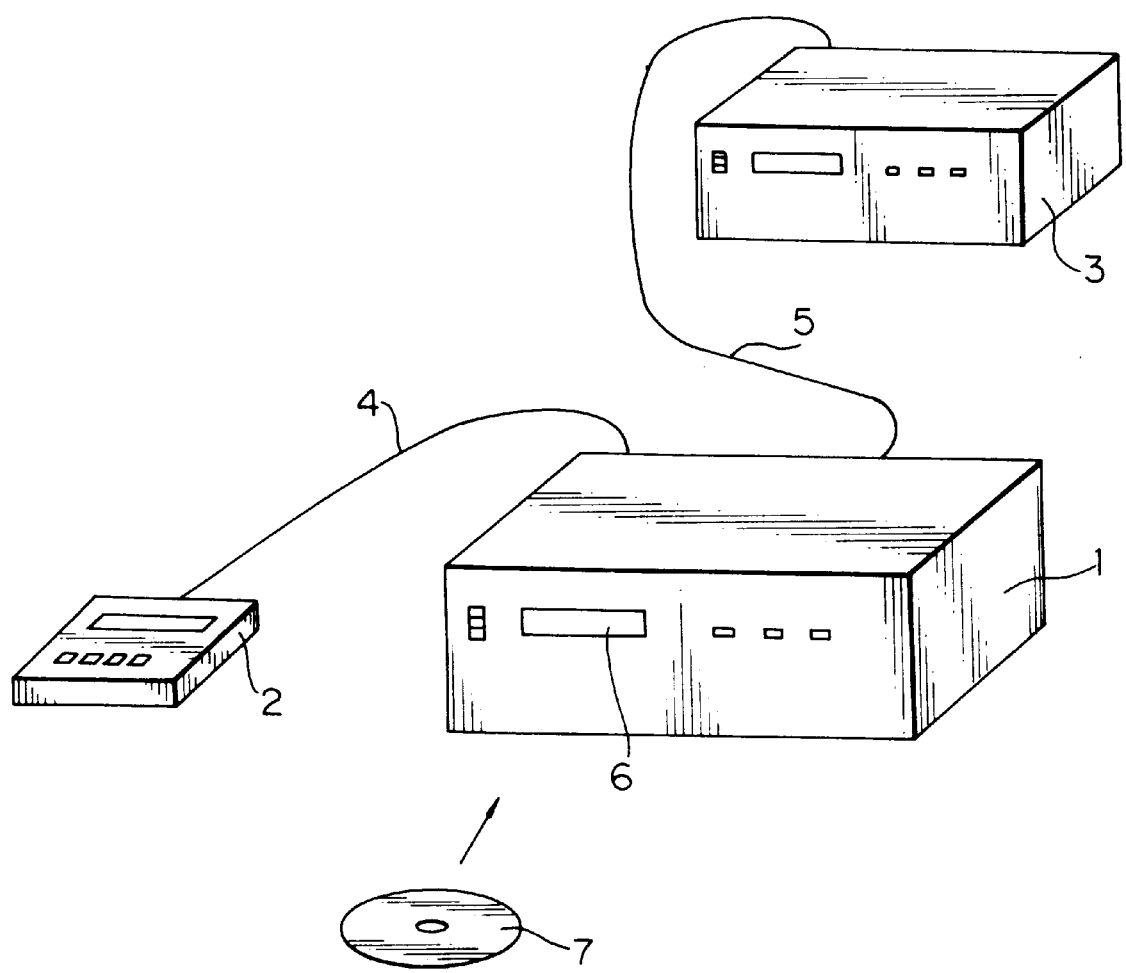
FIG. 1 is a perspective view describing a CD-R system to which the present invention can be applied.

An embodiment of the present invention will be described in the following order.
 a. Overall construction of system
 b. Construction of CD-R recorder
 c. Outline of record operation
  c1. After-TOC mode
  c2. Pre-TOC record mode
  c3. Postscript basis pre-TOC mode
 d. TOC data forming process in each mode
a. Overall construction of system Hereunder, an embodiment of the present invention will be described with reference to the accompanying drawings. FIG. 1 shows an outline of a CD-R system to which the present invention has been applied. In the figure, reference numeral 1 denotes a CD-R recorder main unit. Reference numeral 2 denotes a controller. Reference numeral 3 denotes a music source player such as a CD player or a digital tape recorder.

The CD-R recorder main unit 1 and the controller 2 are connected with a cable 4. The CD-R recorder main unit 1 and the controller 2 can bidirectionally communicate each other. The CD-R recorder main unit 1 and the music source player 3 are connected with a cable 5. Audio signals of a music program to be recorded are supplied from the music source player 5 to the CD-R recorder main unit 1. When music data is recorded on a CD-R disc, a disc entrance 6 of the CD-R recorder main unit 1 is opened. Through the disc entrance 6, a postscript type optical CD-R disc 7 is loaded.

Figure 2:
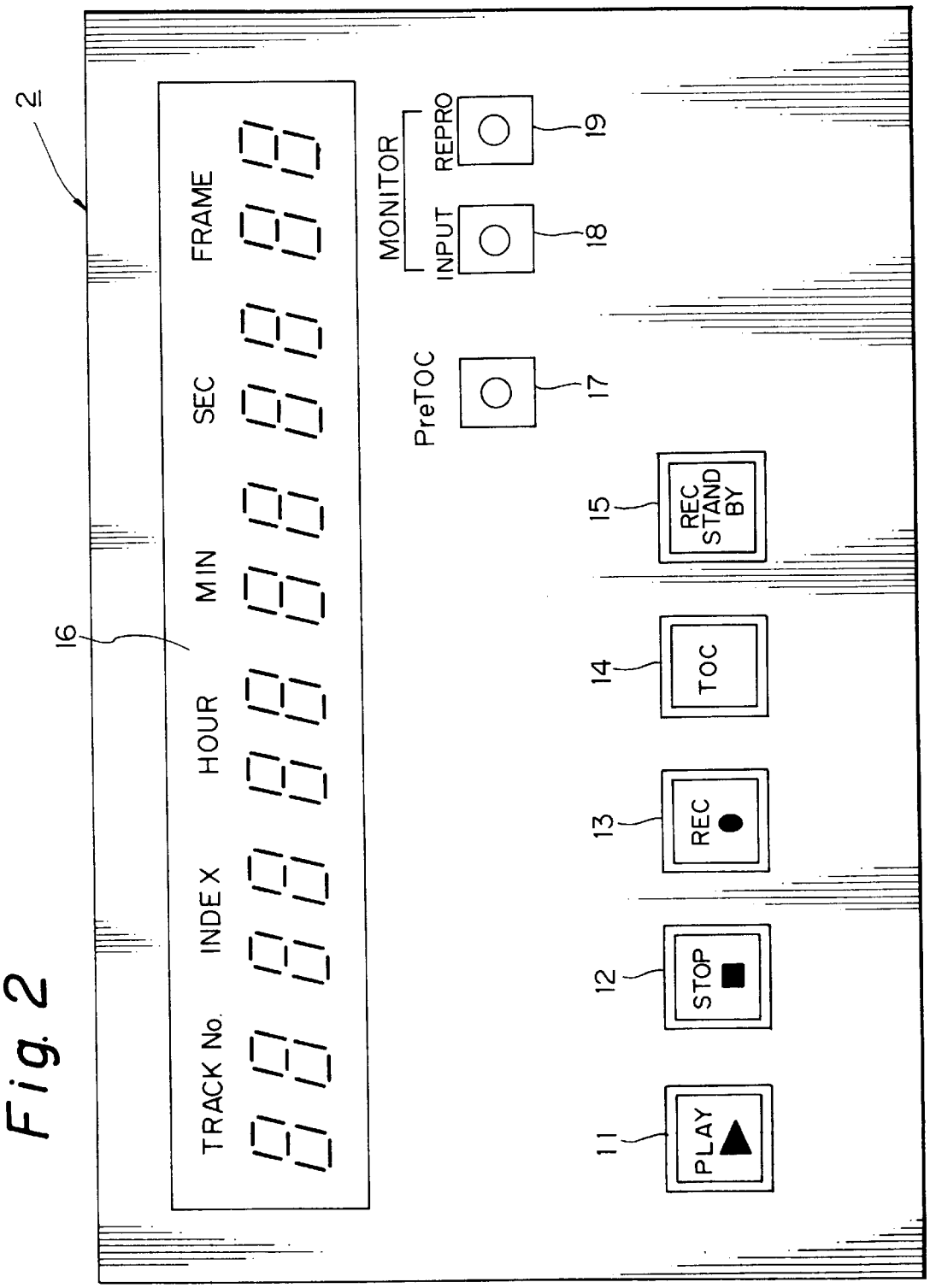
FIG. 2 is a plan view describing a controller to which the present invention can be applied.

The CD-R recorder main unit 1 can be operated with the controller 2. FIG. 2 shows the construction of an operation panel of the controller 2. As shown in the figure, the control panel of the controller 2 has disc control keys such as a "PLAY" key 11, a "STOP" key 12, a "REC" key 13, a "TOC" key 14, and a "REC-STAND-BY" key 15. The "PLAY" key 11 is used to enter the CD-R recorder main unit 1 in a reproduction mode. The "STOP" key 12 is used to stop any operation of the CD-R recorder main unit 1. The "REC" key 13 is used to enter the CD-R recorder main unit 1 in a record mode. The "TOC" key 14 is used to enter the CD-R recorder main unit 1 in a TOC data record mode. The "REC-STAND-BY" key 15 is used to enter the CD-R recorder main unit 1 in a record stand-by mode.

In addition, the operation panel of the controller 2 has a disc time display portion 16. The disc time display portion 16 displays "TRACK-No", "INDEX", "HOUR", "MIN", "SEC", "FRAME", and so forth.

Moreover, the operation panel of the controller 2 has a "Pre TOC" key 17, a "MONITOR-INPUT" key 18, and a "MONITOR-REPRO" key 19. The "Pre TOC" key 17 is used to turn on and off a pre-TOC mode. The "MONITOR-INPUT" key 18 and the "MONITOR-REPRO" key 19 are used to select a monitor sound from an input side and that from a reproduction side, respectively.

b. Construction of CD-R recorder

Figure 3:
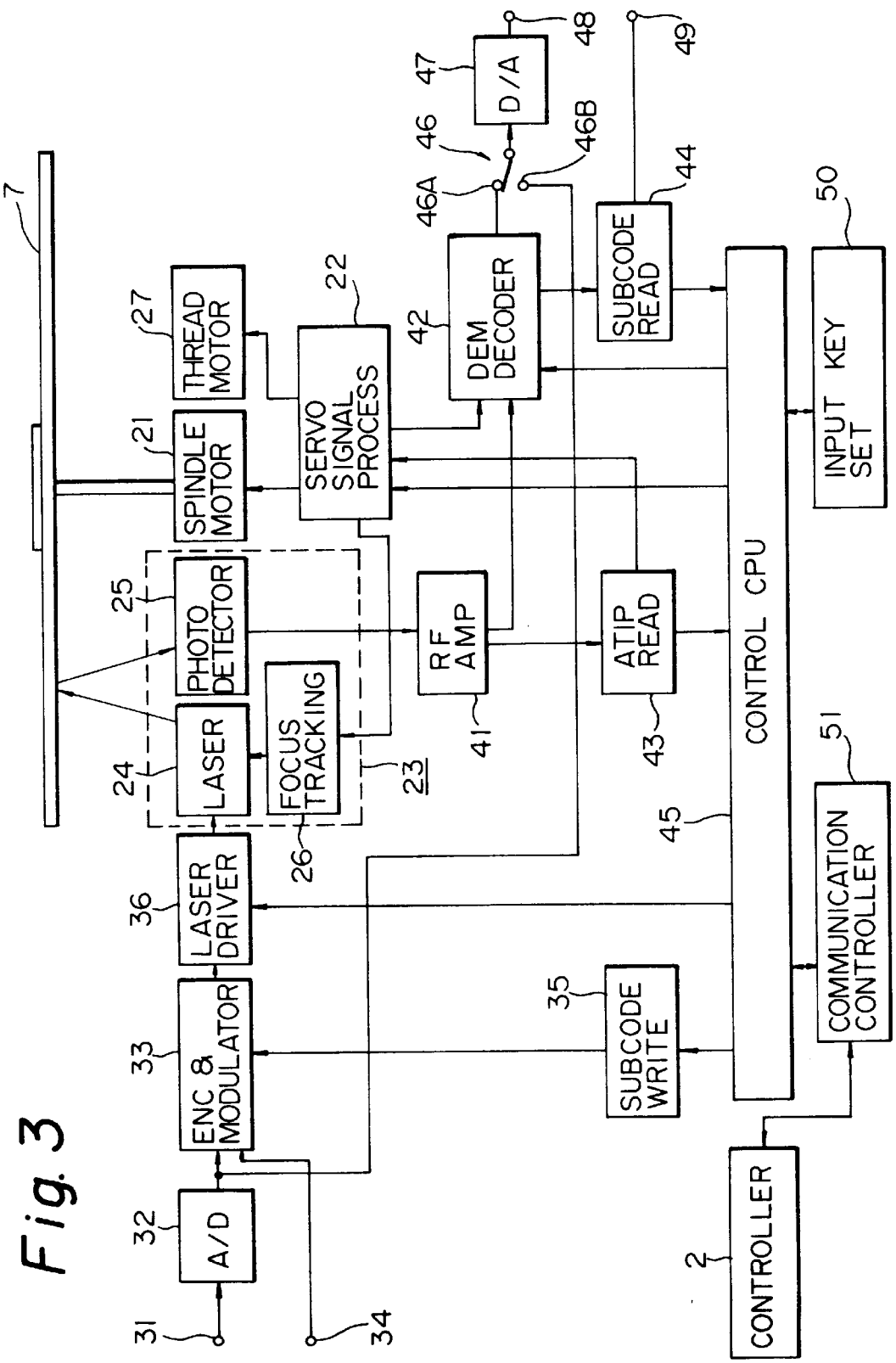
FIG. 3 is a block diagram showing a main unit of a CD-R recorder to which the present invention is applied.

FIG. 3 shows the construction of the CD-R recorder main unit 1. In this construction, the CD-R disc 7 is rotated by a spindle motor 21 under control of a servo signal processing circuit 22. An optical pickup 23 is opposed to the CD-R disc 7, the optical pickup 23 recording and reproducing data to/from the CD-R disc 7. The optical pickup 23 comprises a laser diode 24 which irradiates laser light to the CD-R disc 7, a photo detector 25 which receives reflected light, a focus and tracking control unit 26, and a lens assembly. The focus and tracking control unit 26 is, for example, a two-axis type device. The focus and tracking control unit 26 is controlled by a servo signal processing circuit 22.

In a record mode, an audio signal is supplied from, for example, the music source player 3 to an input terminal 31. This audio signal is converted into a digital signal by an A/D converter 32. The resultant signal is supplied to an encoder and modulating circuit 33. In addition, from an input terminal 34, subcode data is supplied. This subcode data is supplied to the encoder and modulating circuit 33. In the encoder and modulating circuit 33, for example record data is developed into frames. The frames are error-corrected and encoded by using CIRC (Cross-Interleaved Reed-Solomon Code). The resultant data is added to a subcode and a sync which are received from the input terminal 34 or a subcode write circuit 35. Then, the data is EFM (8–14) modulated. Thereafter, the resultant data is supplied to the optical pickup 23 through a laser driver 36. By the optical pickup 23, music data is recorded on the CD-R disc 7. The TOC data process in the record mode will be described later.

In the reproduction mode, a record signal on the CD-R disc 7 is reproduced by the optical pickup 23. The resultant signal is supplied to a demodulation circuit and decoder 42 through an RF amplifier 41. In addition, the signal is supplied to an ATIP read circuit 43. In the demodulation circuit and decoder 42, the reproduced signal is EFM-demodulated and then CIRC-decoded into subcode information. The subcode information is supplied to a subcode read circuit 44. The resultant subcode information of the subcode read circuit 44 is supplied to a control CPU 45 which controls the entire CD-R recorder main unit 1.

The ATIP obtained from the disc is supplied to an ATIP read circuit 43. In the ATIP read circuit 43, time information is read and this time information is supplied to the control CPU 45.

The output of the demodulation circuit and decoder 42 is supplied to a terminal 46A of a switch circuit 46. Another terminal 46B of the switch circuit 46 receives the output of the A/D converter 32. The switch circuit 46 accords with the above-mentioned "MONITOR-INPUT" key 18 and the "MONITOR-REPRO" key 19 which respectively select the monitor sound from the input side and that from the reproduction side. The output of the switch circuit 46 is supplied to a D/A converter 47. In the D/A converter 47, a digital audio signal is converted into an analog audio signal. This analog audio signal is output from an output terminal 48. The subcode which is read in the subcode read circuit 44 is output from a subcode output terminal 49.

The control CPU 45 which controls the entire CD-R recorder main unit 1 is provided with an input key set 50 and a communication controller 51. The control CPU 45 bidirectionally communicates with the external controller 2 through the communication controller 51.

c. Outline of record operation

Next, the operation sequence of recording music data on a CD-R disc using the CD-R recorder main unit 1 will be described with reference to flow charts of FIGS. 4 to 6B.

In the embodiment of the present invention, one of the following three types of operation modes for recording music data on a CD-R disc can be selected.

i. After-TOC mode: After all music data has been recorded, TOC data is recorded.
ii. Pre-TOC mode: After TOC data has been recorded so as to divide a recording time period of each music program into segments of a predetermined time period, music data is recorded in accordance with segments divided.
iii. Postscript basis pre-TOC mode: When music data for several music programs has been recorded, the remaining area is divided into segments of a predetermined length for each music program. The TOC data obtained by dividing the remaining area into segments of the predetermined length is recorded along with TOC data of music programs recorded. Thereafter, the music data is recorded in accordance with the segments divided.

These modes are set by the "Pre TOC" key 17 as tabulated in the following table.

| Position of "Pre TOC" key | ON | OFF |
| --- | --- | --- |
| Blank CD-R disc | Pre-TOC operation | Invalid |
| Non-blank CD-R disc | Postscript basis pre-TOC operation | After-TOC operation | c1. After-TOC mode

Figure 4:
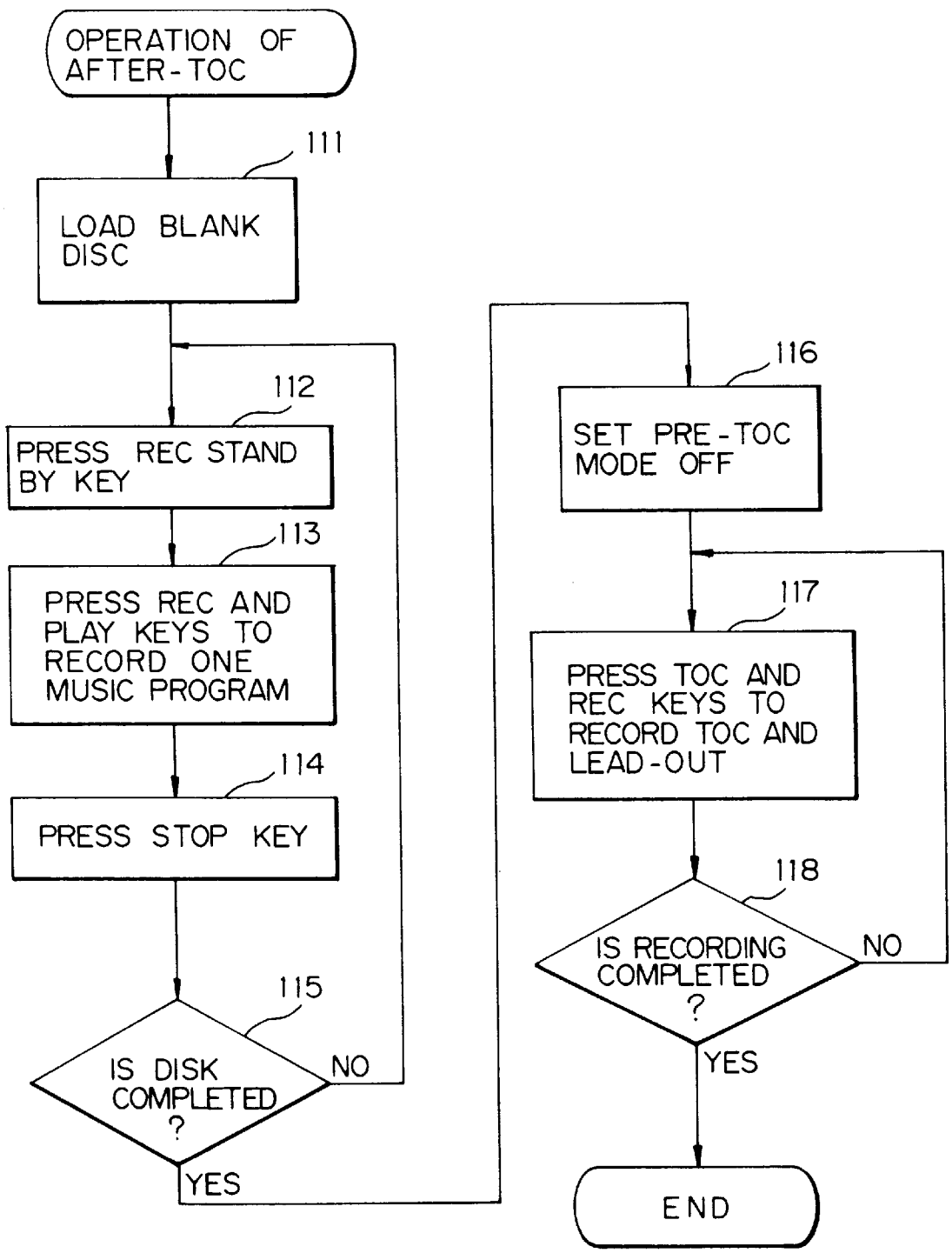
Figure 7:
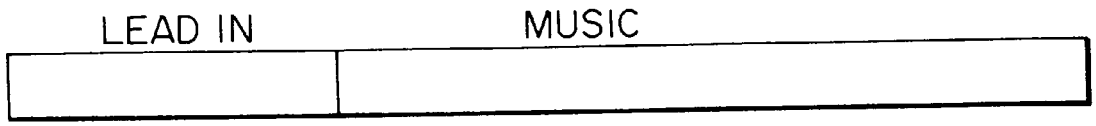
FIGS. 7 to 13 are schematic diagrams describing the embodiment of the present invention.

FIG. 4 is a flow chart showing the record operation in the after-TOC mode. In the after-TOC mode, the user loads a blank CD-R disc in the CD-R recorder main unit 1 (at step 111). The blank disc means a disc where no data has been recorded both in the lead-in area and music area as shown in FIG. 7.

After the blank disc has been loaded, the user presses the "REC-STAND-BY" key 15. Thereafter, the user prepares a music signal of a first music program in the music source player (in step 112). Next, the user presses both the "REC" key 13 and the "PLAY" key 11 at the same time (in step 113). Thereafter, the music signal of the first music program is input from the music source player to the CD-R recorder main unit 1. Thus, the music data of the first music program is recorded on the CD-R disc 7.

Figure 8:
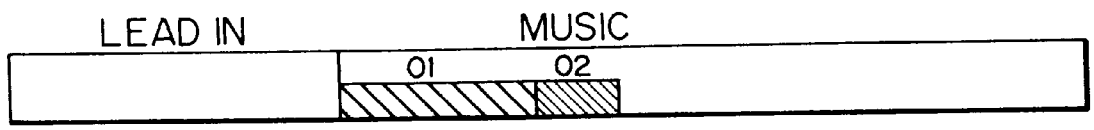

After the first music program has been recorded, the user presses the "STOP" key 12 (in step 114). When the "STOP" key 12 is pressed, the record operation of the first music program is completed. Thus, as shown in FIG. 8, music data is recorded in the music area. As a result, an intermediate disc where data has not been stored in the lead-in and the lead-out areas is provided.

Next, the user determines whether to record a next music program on the disc or to complete the disc (in step 115). When the next music program is recorded, the user returns the flow back to step 112. When the disc is completed, the user turns off the "Pre TOC" key 17 (in step 116). Thereafter, the user presses both the "TOC" key 14 and the "REC" key 13 at the same time (in step 117).

Thus, TOC data in accordance with the time information of the music data which has been recorded is recorded in the lead-in area. In addition, predetermined data is recorded in the lead-out area. Next, the user determines whether or not the record operation has been completed (in step 118). After the record operation has been completed, the after-TOC record operation is completed.

Figure 9:

As described above, on a disc where music data has been recorded in the after TOC mode, TOC data is recorded in the lead-in area and music data in the music area as shown in FIG. 9. In addition, predetermined data is recorded in the lead-out area is recorded at the end of the music data. On a disc where data has been recorded in the after-TOC mode as shown in FIG. 9, music data can be recorded on the postscript basis.

c2. Pre-TOC record mode

Figure 5:
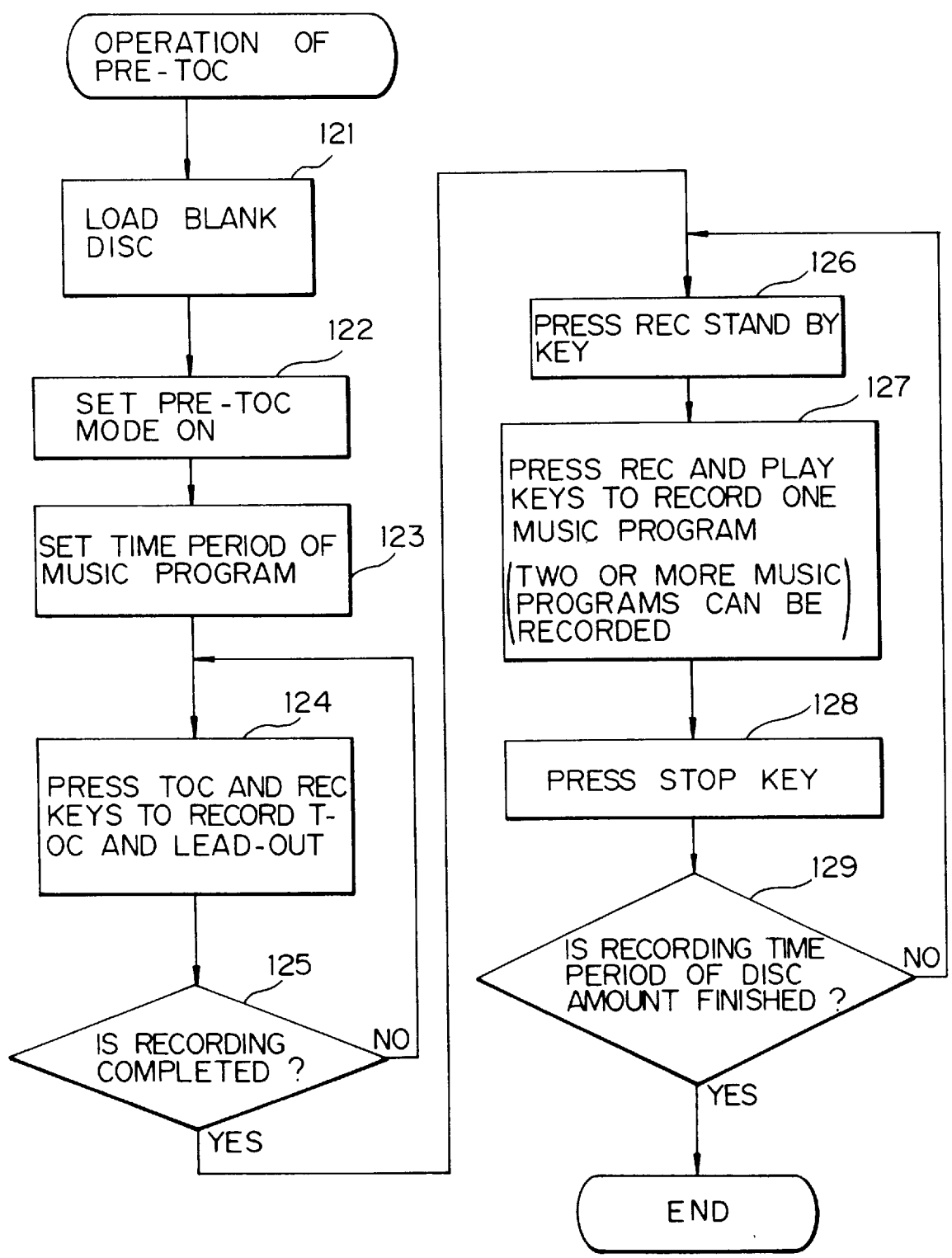

Next, the pre-TOC record mode will be described. FIG. 5 is a flow chart showing a record operation of the pre-TOC mode. In the pre-TOC mode, the user first loads the blank CD-R disc 7 in the CD-R recorder main unit 1 (in step 121). After the blank disc has been loaded, the user turns on the "Pre TOC" key 17 (in step 122). Thereafter, the user sets a time period of each music program (in step 123).

Then, the user presses both the "TOC" key 14 and the "REC" key 13 at the same time. Thus, TOC data in accordance with a time period which is set in the lead-in area is recorded. In addition, predetermined data is recorded in the lead-out area (in step 124). Next, the user determines whether or not the record operation has been completed (in step 125). When the record operation has been completed, a disc where TOC data has been recorded in the lead in and predetermined data in the lead out area as shown in FIG. 10 is provided.

Figure 10:
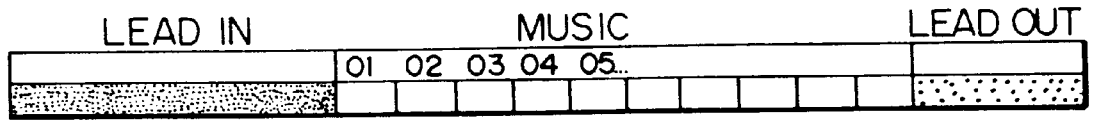
Figure 11:
Figure 12:

The disc as shown in FIG. 10 can record music data on the postscript basis. When music data is recorded on the disc on the postscript basis, the user presses the "REC-STAND-BY" key 15. In addition, the user prepares a music signal of a first music program in the music source player (in step 126). After the music signal of the first music program has been prepared, the user presses both the "REC" key 13 and the "PLAY" key 11 at the same time (in step 127). In addition, the music signal of the first music program is input from the music source player to the CD-R recorder main unit 1. Thus, the music data of the first music program is recorded on the CD-R disc. After the music data of the first music program has been recorded, the user presses the "STOP" key 12 (in step 128). Thus, as shown in FIG. 11, the music data of the first music program is recorded in segments of a predetermined time period. Then, the user determines whether or not there is a remaining blank area on which data can be recorded on the disc. When there is a remaining blank area, the user returns the flow back to step 126. Thus, music data of a next music program is recorded.

Thereafter, as long as there is a remaining blank area on the disc, music data can be recorded on the disc on the postscript basis.

In the record operation of music data in step 127, the music data of one music program can be recorded in a plurality of segments of the predetermined time period.

c3. Postscript basis Pre-TOC mode

Figure 6A:
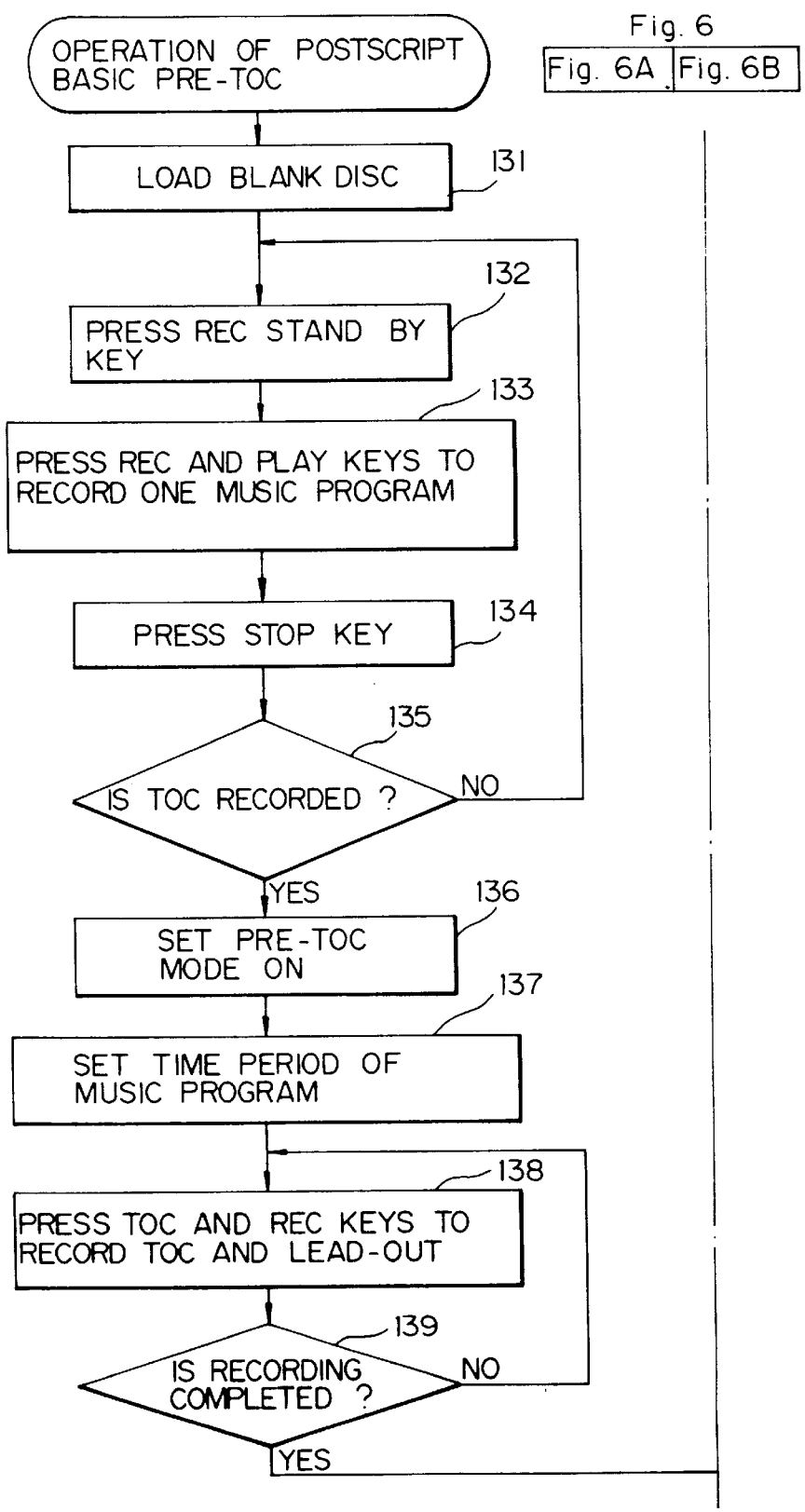
Figure 6B:
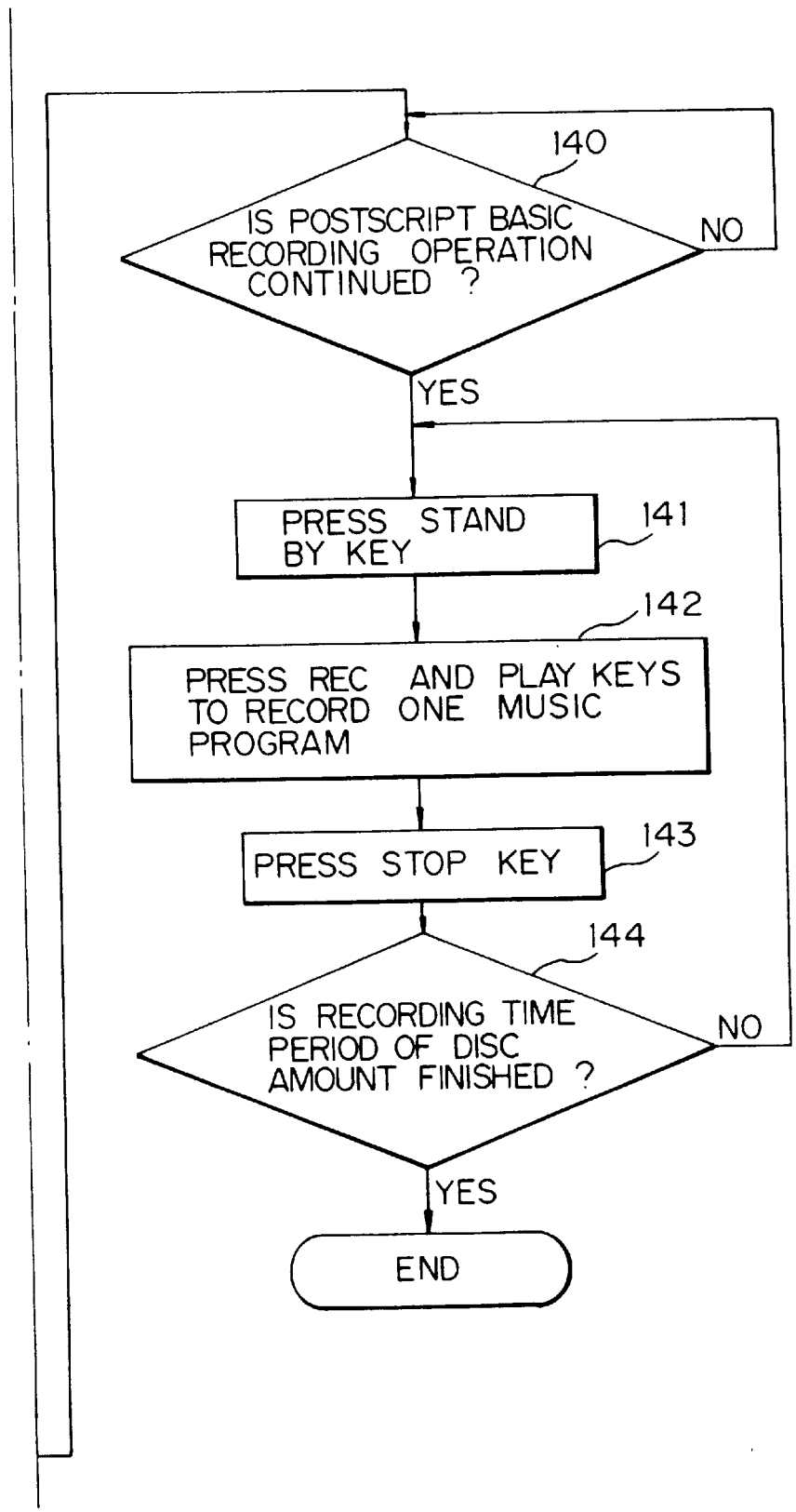

Next, the postscript basis pre-TOC record mode will be described. FIGS. 6A and 6B together are a flow chart showing a record operation of the postscript basis pre-TOC mode. In the postscript basis pre-TOC mode, the user first loads the blank CD-R disc 7 in the CD-R recorder main unit 1 (in step 131). After the blank disc has been loaded, the user presses the "REC-STAND-BY" key 15. In addition, the user prepares a music signal of a first music program in the music source player (in step 132). After the music signal has been prepared, the user presses both the "REC" key 13 and the "PLAY" key 11 at the same time (in step 133). Thereafter, the music signal of the first music program is input from the music source player to the CD-R recorder main unit 1. Thus, the music data of the first music program is recorded on the CD-R disc 7.

After the first music program has been recorded on the CD-R disc 7, the user presses the "STOP" key 12 (in step 134). Thus, the record operation of the first music program is completed. As a result, an intermediate disc where the music data has been recorded in the music area and no data has been recorded in the lead-in area and lead-out area is provided.

Next, the user determines whether to record a next music program or TOC (in step 135). When the next music program is recorded, the user returns the flow back to step 132. When the TOC is recorded, the user turns on the "Pre TOC" key 17 (in step 136). Then, the user sets a time period of each music program (in step 137).

Figure 13:
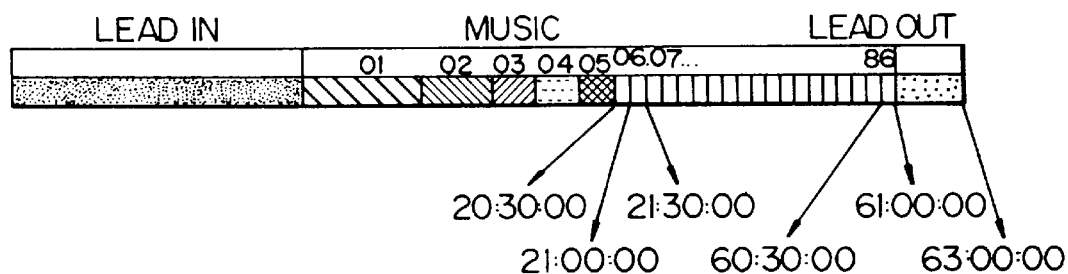

When the user presses both the "TOC" key 14 and the "REC" key 13, the time information of the music programs which have been recorded and information of the time period which is set are recorded in the lead-in area as TOC data. In addition, predetermined data is recorded in the lead-out area (in step 138). Then, the user determines whether or not the record operation has been completed (in step 139). When the record operation has been completed, a disc as shown in FIG. 13 is provided. The data of TOC contains time information of music data in steps 132 to 135 and time information where the remaining area is divided in step 137.

On the disc shown in FIG. 13, music data can be recorded on the postscript basis. Thereafter, the user determines whether or not to record music data on the postscript basis (in step 140). When music data is recorded on the postscript basis, the user presses the "REC-STAND-BY" key 15. Moreover, the user prepares a music signal of a first music program in the music source player (in step 141). After the music signal has been prepared, the user presses both the "REC" key 13 and the "PLAY" key 11 at the same time (in step 142). Thereafter, the music signal of the first music program is input from the music source player to the CD-R recorder main unit 1. Thus, the music data is recorded on the CD-R disc on the postscript basis. After the music data of the first music program has been recorded on the CD-R disc on the postscript basis, the user presses the "STOP" key 12 (in step 143). Thereafter, the user determines whether or not there is a remaining blank area on which data can be recorded on the disc. When there is a remaining blank area, the user returns the flow back to step 141. Thus, next music data is recorded on the disc on the postscript basis.

d. TOC data forming process in each mode

Figure 14:
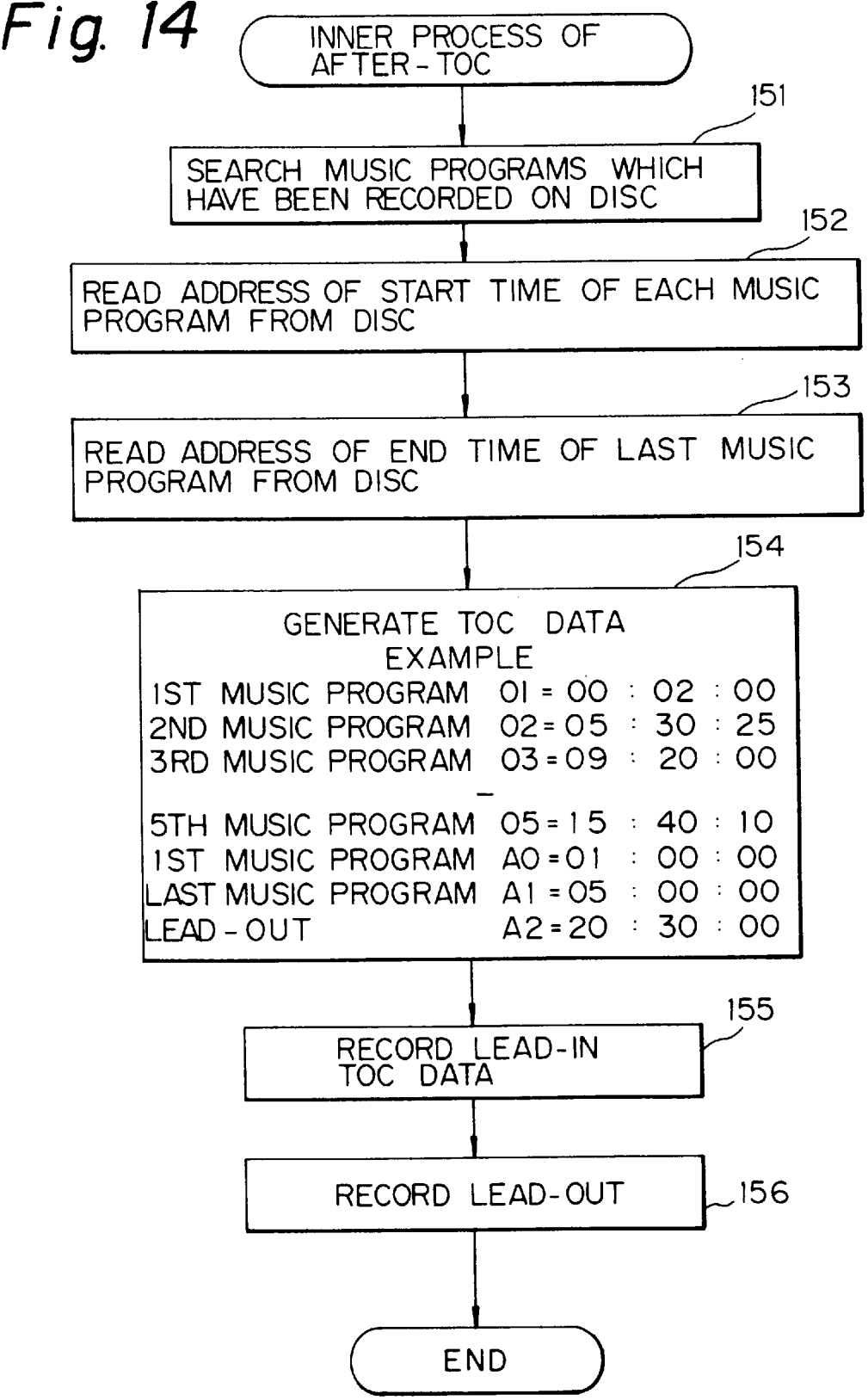

In the CD-R recorder to which the present invention has been applied, the after-TOC mode, the pre-TOC mode, and the postscript basis pre-TOC mode can be set. In the pre-TOC mode, as shown in FIG. 14, when music data is recorded and TOC data is formed, music programs which have been recorded on the disc are searched (in step 151). An address of the start time of each music program is read (in step 152). An address of the end time of the last music program is read (in step 153). Thus, the TOC data is formed (in step 154). The time at which each music program starts, the first music program number, the last music program number, and the time at which the last music program ends are TOC data. This TOC data is recorded in the lead-in area (in step 155). Predetermined data is recorded in the lead-out area (in step 156). In this after-TOC mode, after the TOC has been recorded, other music data cannot be recorded on the postscript basis.

Figure 15B:
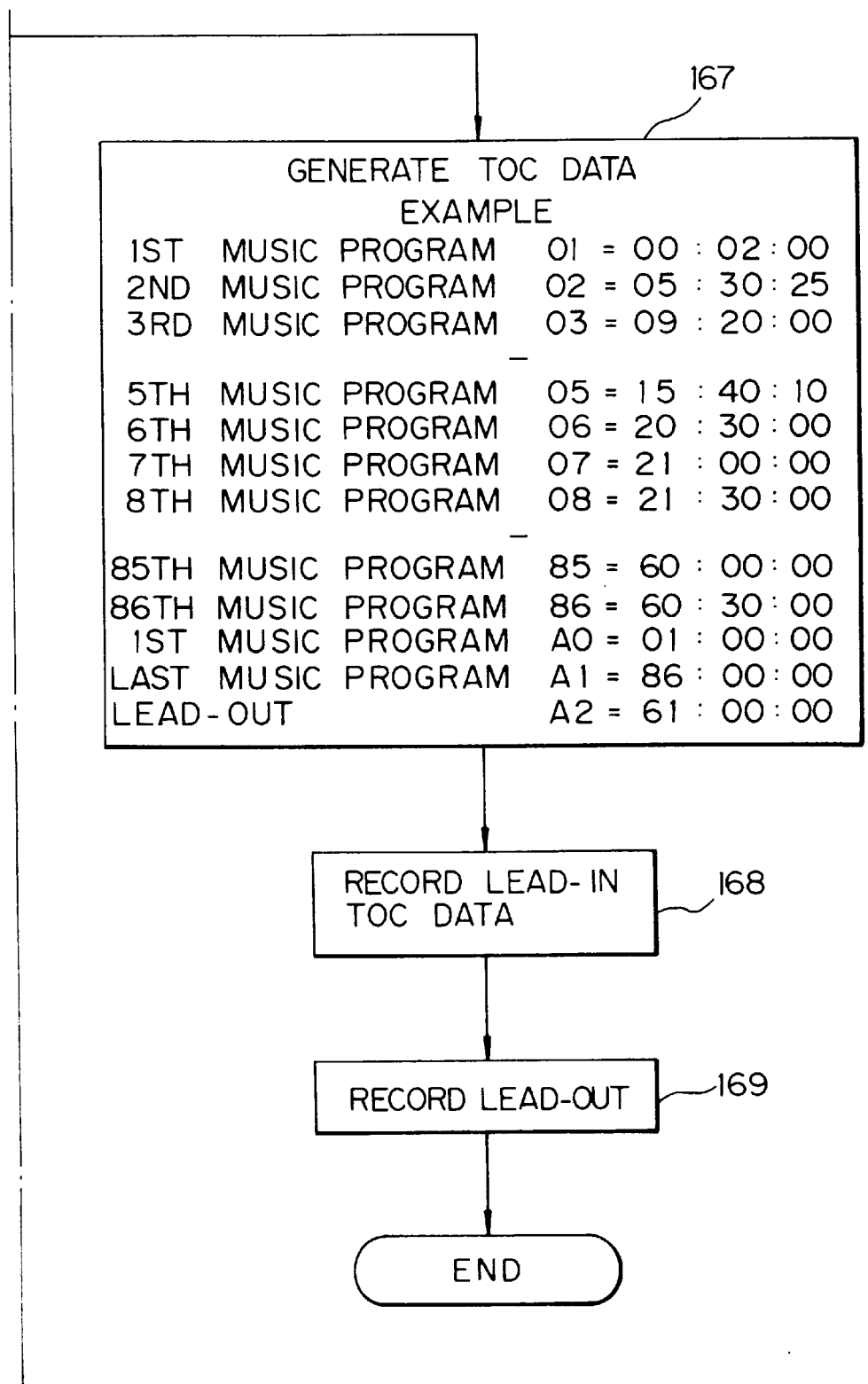

In the postscript basis pre-TOC mode, as shown in FIGS. 15A and 15B, when music data is recorded, music programs which have been recorded on the disc are searched (in step 161). An address of the start time of each music program is read (in step 162). An address of the end time of the last music program which have been recorded before the TOC is recorded is read (in step 163). The time at which each music program starts, the first music program number, the last music program number, and the time at which the last music program ends are TOC data of music data which has been recorded before the TOC is recorded.

Thereafter, a total recording time period of the disc is read from ATIP (in step 164). A setting time of each music program which is recorded after the TOC is recorded is read (in step 165). The number of music programs which can be recorded in the remaining portion of the disc is calculated (in step 166). When the recording time period of the disc is 63 minutes and music data which lasts for 20 minutes and 30 seconds has been recorded before the TOC is recorded, provided that the setting time of each music program after the TOC has been recorded is 30 seconds, the number of music programs which can be recorded in the remaining portion of the disc can be given by the following expression.

[63 min–20 min and 30 sec–2 min]/30 sec=78 music programs.

In the above expression, a time period of 2 minutes is used for the lead-out area. Accordingly, the TOC data is formed. After the TOC data has been formed, it is recorded in the lead-in area (in step 168). Thereafter, predetermined data is recorded in the lead-out area (in step 169).

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

According to the present invention, the postscript basis pre-TOC mode can be set. In other words, after music data of several music programs has been recorded, the recording time of the remaining area is divided into segments of a predetermined time period for each music program. Thus, the TOC data which is obtained by dividing the remaining area into segments of a predetermined time period can be recorded along with the TOC data of the music programs which have been recorded. In this mode, the time period of music data which has been recorded before a TOC is recorded accords with the data of the TOC. Thus, music programs on the disc can be easily accessed. Moreover, in the postscript basis pre-TOC mode, even after a TOC has been recorded, music data can be recorded on the postscript basis. Thus, the disc can be used without a loss of the storage capacity.

What is claimed is:

1. In an optical disc recording/reproducing apparatus having means for seeking a predetermined position on a postscript type optical disc, means for reading recorded data from said disc, and means for recording data and a time table on a predetermined data area and a table area of said disc, respectively, a method of recording said time table comprising the sequential steps of:

reading position data corresponding to a position of each recorded data on said disc;

detecting a remaining data area on which no data is recorded;

dividing said remaining data area into a plurality of unit data areas; and recording position data of each recorded data and each unit data area on said time table area.

2. The optical disc recording/reproducing apparatus according to claim 1, wherein said remaining data area is equally divided into said plurality of unit data areas.

3. The optical disc recording/reproducing apparatus according to claim 1, wherein the lengths of said unit data areas formed by dividing said remaining data area can be set.

4. In an optical disc recording/reproducing apparatus having means for seeking a predetermined position on a postscript type optical disc, means for reading recorded data from said disc, and means for recording data and a time table on a predetermined data area and a time table area of said disc, respectively, a method of recording said time table comprising the steps of:

(a) reading time code data corresponding to a starting position of each recorded data;

(b) reading time code data corresponding to the ending position of the last recorded data; and after the completion of steps (a) and (b), then sequentially performing the steps of (c) reading a time length corresponding to the data area;

(d) calculating a remaining time length corresponding to a remaining data area on which no data is recorded by subtracting the time code data corresponding to said ending position from said time length corresponding to said data area;

(e) dividing said calculated remaining time length to construct a plurality of unit data areas; and (f) recording time code data corresponding to said starting position of each recorded data and each unit data area on said time table area.

5. A method of operating an optical disc recording/reproducing apparatus of the type having means for seeking a predetermined position on a postscript type optical disc, means for reading recorded data from said disc, means for recording data and a time table on a predetermined data area and a table area of said disc, respectively, and means for selecting one mode from a plurality of modes of recording said time table, one of said plurality of modes comprising the sequential steps of:

reading position data corresponding to a position of each recorded data on said disc;

detecting a remaining data area on which no data is recorded;

dividing said remaining data area into a plurality of unit data areas; and recording said position data of each recorded data and each unit data area on said time table area.

6. The method of operating an optical disc recording/reproducing apparatus according to claim 5, wherein another mode of the plurality of modes is the after-TOC technique.

7. The method of operating an optical disc recording/reproducing apparatus according to claim 5, wherein another mode of the plurality of modes is the pre-TOC technique.

8. The method of operating an optical disc recording/reproducing apparatus according to claim 5, wherein said plurality of modes are an after-TOC mode, a pre-TOC mode and a postscript basis pre-TOC mode and one of the after-TOC mode, the pre-TOC mode and the postscript basis pre-TOC mode is selected.

* * * * *